(12) United States Patent
Kulkarni et al.

(10) Patent No.: US 10,049,035 B1
(45) Date of Patent: Aug. 14, 2018

(54) STREAM MEMORY MANAGEMENT UNIT (SMMU)

(71) Applicant: Reniac, Inc., San Jose, CA (US)

(72) Inventors: Chidamber Kulkarni, Kondapur (IN); Prasanna Sundararajan, San Jose, CA (US)

(73) Assignee: Reniac, Inc., San Jose, CA (US)

( * ) Notice: Subject to any disclaimer, the term of this patent is extended or adjusted under 35 U.S.C. 154(b) by 57 days.

(21) Appl. No.: 15/061,293

(22) Filed: Mar. 4, 2016

Related U.S. Application Data

(60) Provisional application No. 62/130,994, filed on Mar. 10, 2015.

(51) Int. Cl.
*G06F 12/00* (2006.01)
*G06F 12/02* (2006.01)
*G11C 7/10* (2006.01)

(52) U.S. Cl.
CPC ........ *G06F 12/023* (2013.01); *G06F 12/0246* (2013.01); *G11C 7/1072* (2013.01); *G06F 2212/1044* (2013.01); *G06F 2212/7201* (2013.01)

(58) Field of Classification Search
CPC .............. G06F 12/023; G06F 12/0246; G06F 2212/1044; G06F 2212/7201; G11C 7/1072
See application file for complete search history.

(56) References Cited

U.S. PATENT DOCUMENTS

| | | | |
|---|---|---|---|
| 5,699,548 A | 12/1997 | Choudhury et al. | |
| 6,446,617 B2 | 9/2002 | Bianchi et al. | |
| 9,043,557 B1 | 5/2015 | Sundararajan et al. | |
| 9,262,325 B1 | 2/2016 | Sundararajan et al. | |
| 9,286,221 B1 | 3/2016 | Sundararajan et al. | |
| 2010/0274950 A1* | 10/2010 | Yano ................... | G06F 12/0246 711/103 |
| 2011/0138221 A1 | 6/2011 | Hanaoka et al. | |
| 2011/0238953 A1 | 9/2011 | Metsugi et al. | |
| 2012/0124276 A1* | 5/2012 | Ahn ..................... | G06F 12/0246 711/103 |
| 2014/0089608 A1* | 3/2014 | King ................... | G06F 12/1027 711/154 |
| 2015/0026368 A1* | 1/2015 | Kagan ................. | G06F 13/28 710/22 |

* cited by examiner

*Primary Examiner* — Prasith Thammavong
(74) *Attorney, Agent, or Firm* — Crawford Maunu PLLC (57) ABSTRACT

A disclosed stream memory management circuit includes a first memory controller circuit for accessing a first memory of a first type. A second memory controller circuit is provided for accessing a second memory of a second type different from the first type. An access circuit is coupled to the first and second memory controller circuits for inputting and outputting streaming data. An allocation circuit is coupled to the access circuit, the allocation circuit configured and arranged to select either the first memory or the second memory for allocation of storage for the streaming data in response to attributes associated with the streaming data. A de-allocation circuit is coupled to the access circuit for de-allocating storage assigned to the streaming data from the first and second memories.

27 Claims, 7 Drawing Sheets

STREAM MEMORY MANAGEMENT UNIT (SMMU)

TECHNICAL FIELD

The disclosure generally relates to memory management units for stream processing.

BACKGROUND

With the increase in data volume and complexity that needs to be handled by various applications, there is a need for a more flexible data processing architecture that also improves overall performance and efficiency. Stream processing and real-time query processing have become integral for many applications. A conventional data processing architecture involves processing of data which is "at rest" or present in a stored program. Stream processing in contrast is a more complex data processing technology that involves processing of data while it is still "in motion" or as it arrives in a continuous stream in real-time on an input/output channel, and before it reaches structured and/or retentive storage. With stream processing, large rapidly changing data volumes can be aggregated and analyzed as soon as they become available without having to be stored, thereby increasing overall speed and efficiency of data handling and analysis.

SUMMARY

A disclosed stream memory management circuit includes a first memory controller circuit configured and arranged to access a first memory of a first type. A second memory controller circuit is configured and arranged to access a second memory of a second type different from the first type. An access circuit is coupled to the first and second memory controller circuits and is configured and arranged to input and output streaming data. An allocation circuit is coupled to the access circuit and is configured and arranged to select either the first memory or the second memory for allocation of storage for the streaming data in response to attributes associated with the streaming data. A de-allocation circuit is coupled to the access circuit and is configured and arranged to de-allocate storage assigned to the streaming data from the first and second memories.

A disclosed storage system includes a first memory of a first type, a second memory of a second type different from the first type, and a stream memory management unit. The stream memory management unit includes a first memory controller circuit configured and arranged to access the first memory. A second memory controller circuit is configured and arranged to access the second memory. An access circuit is coupled to the first and second memory controller circuits and is configured and arranged to input and output streaming data. An allocation circuit is coupled to the access circuit and is configured and arranged to select either the first memory or the second memory for allocation of storage for the streaming data in response to attributes associated with the streaming data. A de-allocation circuit is coupled to the access circuit and is configured and arranged to de-allocate storage assigned to the streaming data from the first and second memories.

A disclosed method of managing a heterogeneous memory arrangement includes inputting streaming data by an access circuit. An allocation circuit selects either a first memory or a second memory for allocation of storage for the streaming data in response to attributes associated with the streaming data. The first memory is of a first type, and the second memory is of a second type different from the first type. The allocation circuit allocates storage for the streaming data in one of the first or second memories. A first memory controller circuit accesses the first memory, and a second memory controller circuit accesses the second memory. A de-allocation circuit de-allocates storage assigned to the streaming data from the first and second memories.

Other embodiments will be recognized from consideration of the Detailed Description and Claims, which follow.

BRIEF DESCRIPTION OF THE DRAWINGS

Various aspects and advantages of the disclosed embodiments will become apparent upon review of the following detailed description and upon reference to the drawings in which.

DETAILED DESCRIPTION

In a conventional data processing architecture, memory is first allocated. Data is stored in that memory space, then retrieved by the central processing unit (CPU), processed, and then written back to memory. Once the data in the memory is no longer needed for processing, that memory is de-allocated.

Figure 1:
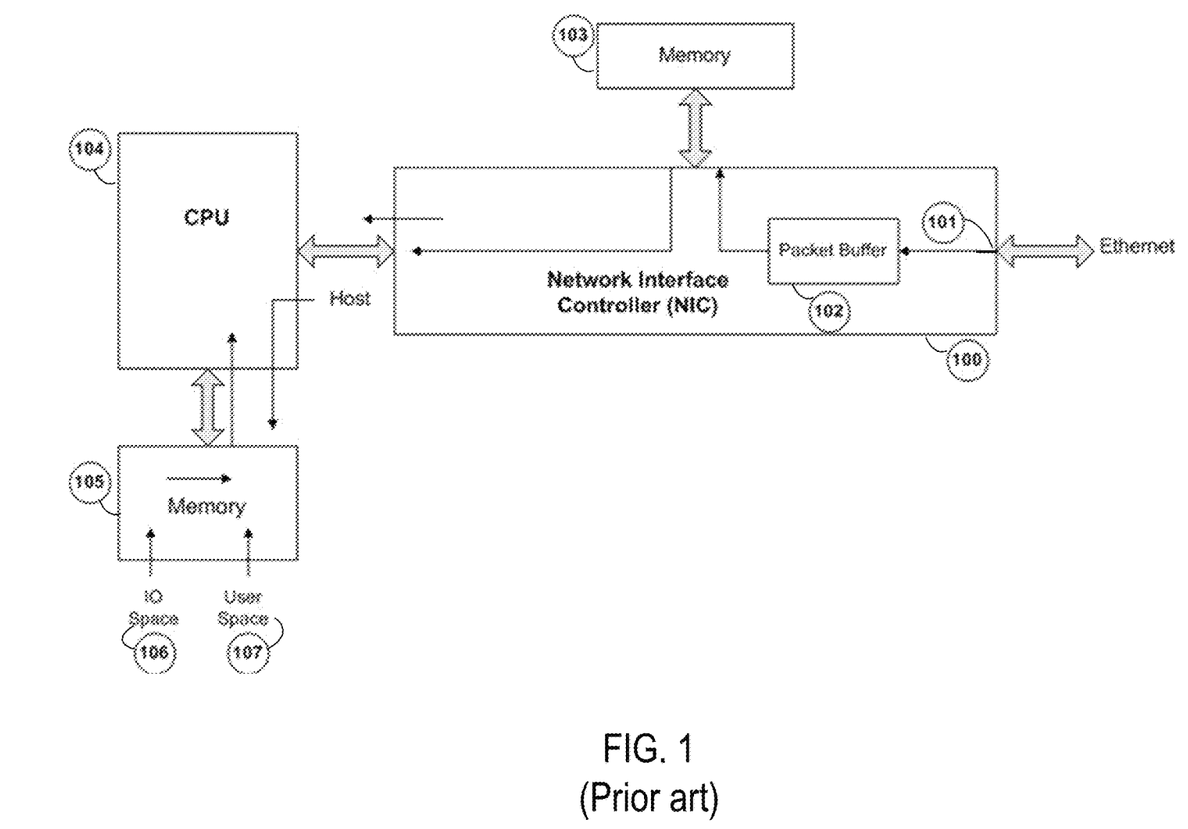
FIG. 1 shows a block diagram of a conventional CPU-based system for processing packets from an Ethernet connection.

FIG. 1 shows a block diagram of a conventional CPU-based system for processing packets from an Ethernet connection. A data packet arrives at the Ethernet Rx port 101 in the network interface card/controller (NIC) 100. The packet is verified and then written to the packet buffer 102 in the NIC. From the packet buffer 102, the packet will be stored into the dynamic random-access memory (DRAM) 103 on the NIC. The NIC initiates an interrupt to the host CPU 104 to indicate the arrival of the packet. The CPU initiates a direct memory access (DMA) transfer of the packet from the DRAM 103 into an IO space 106 of the host memory 105. The address space of the host memory 105 is segregated into IO space 106 and user space 107. The application logic, executing on the CPU 104, is then notified that the packet is present in host memory. The application next allocates memory in the user space 107 and copies the complete packet to user space. Packet processing is then performed out of the memory space and an appropriate output (data packet or any other format) will be written back to memory. This output will either be sent to an IO device or just left in the memory space.

In summary, because of the way the CPU is designed to operate, data is first copied into DRAM memory and processing is then done on the local static random-access (SRAM) memory, typically available in the form of register files and caches on the CPU. Even temporary data first requires memory allocation and then processing. Implementation of such a cache-based architecture however is often inefficient. Specifically considering stream processors, these processors are able to handle multiple streaming applications at once. However, conventional memory management is not tuned for individual requirements of each streaming application.

The disclosure describes a streaming template that can be used to build a flexible data processing architecture for a new class of applications in which memory access and use patterns can be determined as data is being streamed in and out of the system. Some new types of applications typically have high compute intensity, allow for parallel processing, and work with continuous input of data. Big data applications are an example of applications that benefit from stream processing.

An application-specific memory management and store unit can be designed based on the memory access and various use patterns of the application. The memory is optimized specific to each application and overall efficiency is increased. In addition, the streaming of data in and out of the system is based on events, for example, data being streamed on an Ethernet connection via packets. The type of allocation (sequential, interleaved or dynamic) and de-allocation is determined based on those events.

Figure 2:
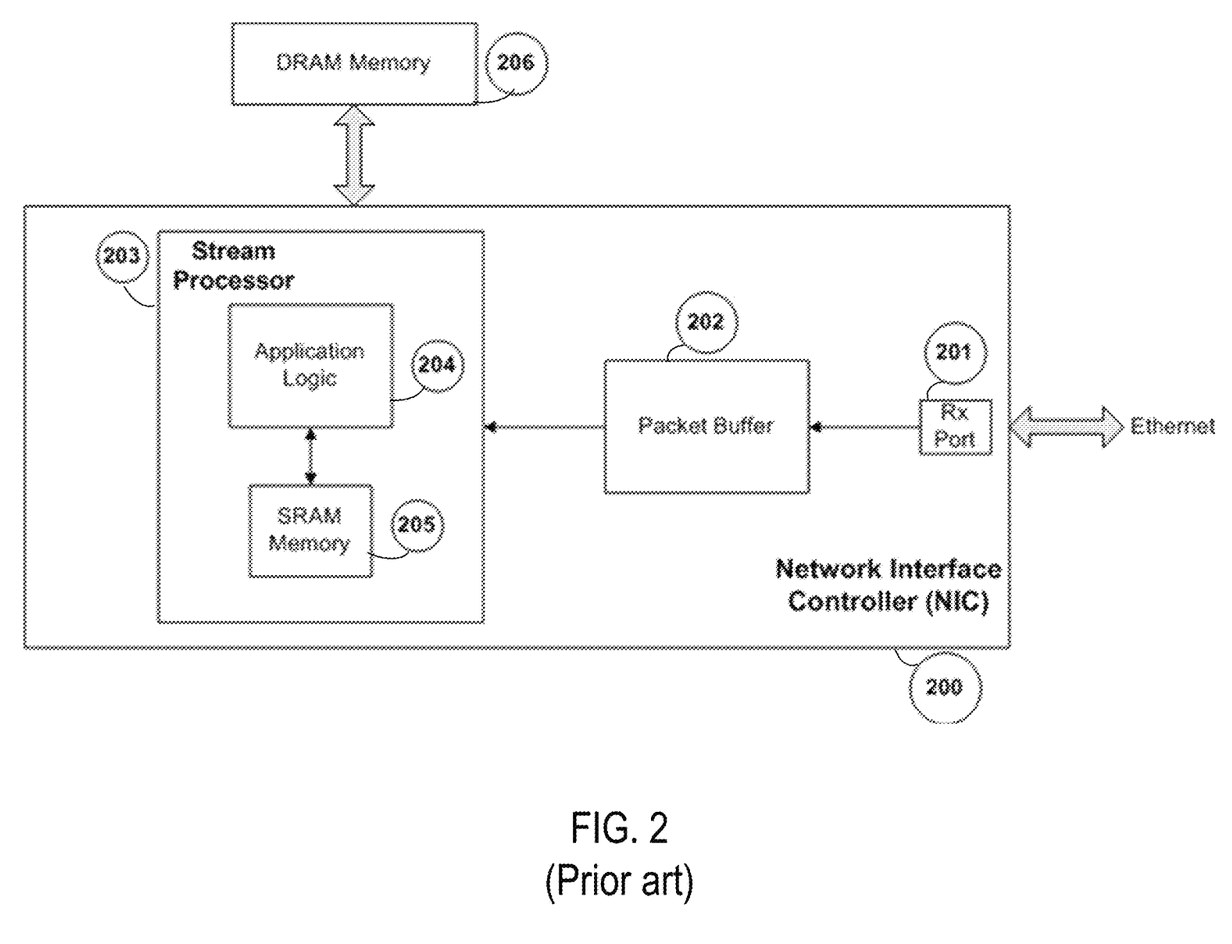
FIG. 2 shows a block diagram of a traditional stream processing architecture for processing packets from an Ethernet connection.

FIG. 2 shows a block diagram of a traditional stream processing architecture for processing packets from an Ethernet connection. A data packet arrives at the Ethernet Rx port 201 in the NIC 200. The packet will be verified as it arrives and then written to the packet buffer 202 in the NIC, which may be implemented as a first-in-first-out (FIFO) based queue. A stream processor 203 implements application logic 204, which monitors the packet buffer FIFO and starts reading the packet out of the FIFO. The processor will do packet processing using its local SRAM memory 205. The application logic would have already partitioned the local SRAM to match the type of data structure required for packet processing. This is different from a CPU-based system where dynamic memory allocation is based on multiple bytes. The output (data packet or any other format) will be written to memory 206 in case it is not destined to an IO device. The output is written to an output device buffer directly (via the device driver) in case it is destined to an IO device.

In the stream processing architecture of FIG. 2, the data is processed as it arrives in the system. The data is copied only as-needed either into the on-chip SRAM, DRAM or Flash memory (NAND-type or NOR-type) if it is destined to be in host memory. In addition, no interrupts are required to move data.

Memory allocation and de-allocation are key functions that are distinct in stream processing versus conventional processing. The need for memory copies and the allocation and de-allocation of temporary data is reduced with stream processing. Memory management units (MMUs) are used in conventional data processing to perform allocation and de-allocation. For streaming applications, a different methodology is required, one in which allocation strategies are application specific.

The disclosed stream memory management unit (SMMU) is a circuit that is configured specifically for streaming applications and in some implementations involves new architectural attributes such as Flash memory. If memory allocation is application-specific, such that the data layout of the memory is altered specific to an application by a static compiler or dynamic run-time analysis, then the overall data processing speeds increase along with the efficiency of use of resources to implement the SMMU.

Figure 3:
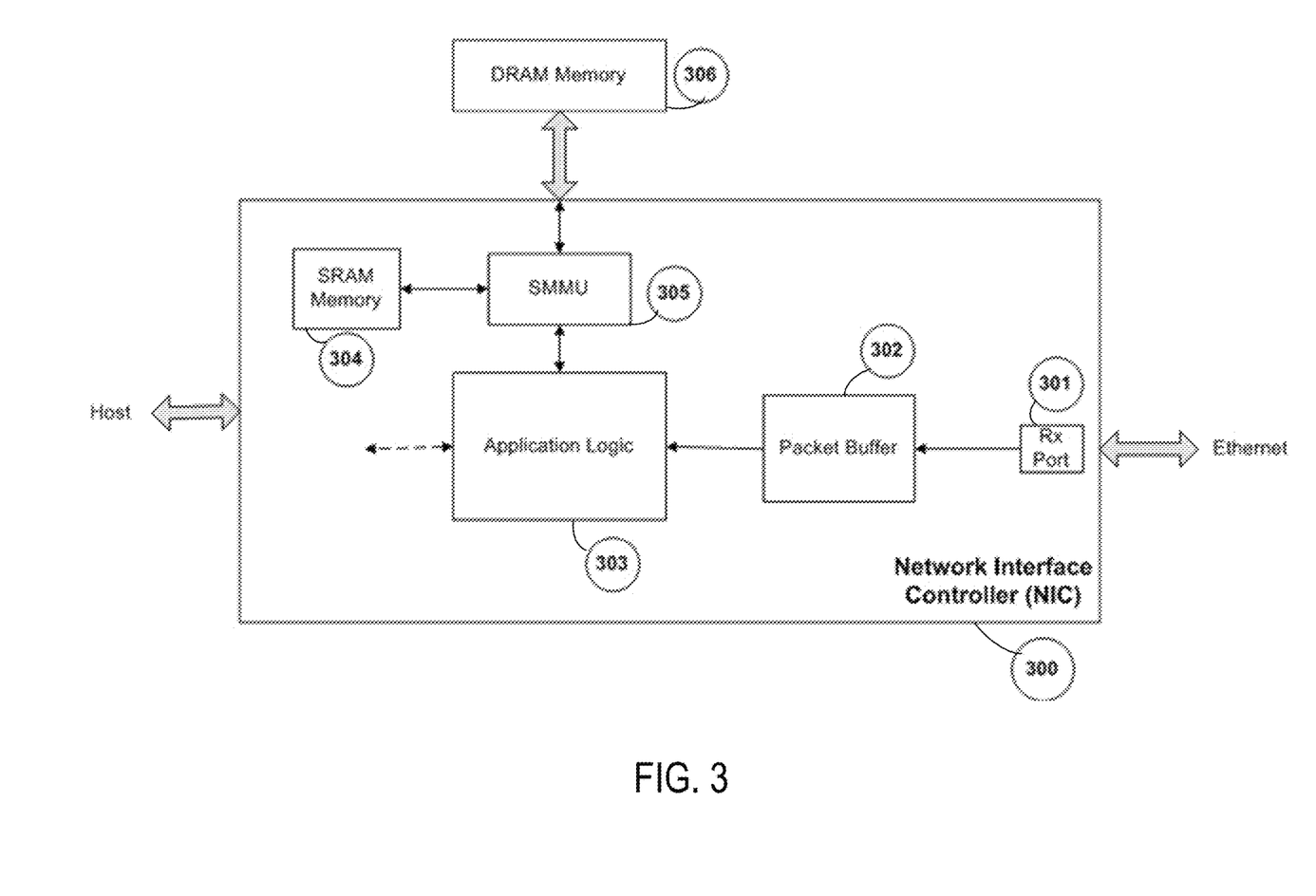
FIG. 3 shows a block diagram of a stream processing circuit for processing packets from an Ethernet connection.

FIG. 3 shows a block diagram of a stream processing circuit for processing packets from an Ethernet connection. A data packet arrives at the Ethernet Rx port 301 in the NIC 300. The packet is verified as the packet arrives, and the packet is then written to the packet buffer 302 in the NIC, which may be implemented as a FIFO-based queue. Application logic 303 monitors the packet buffer FIFO and starts reading the packet out of the FIFO. The application logic will do packet processing using local SRAM memory (304) as well as external DRAM memory 306. The SMMU 305 enables the application logic to have a common address space between SRAM memory 304 and DRAM memory 306, thereby relieving the user from having to manually partition data into local SRAM memory and external DRAM memory. The output (data packet or any other format) will be written to memory 306 in case it is not destined to an IO device. The output is written to an output device buffer directly (via the device driver) in case it is destined to an IO device.

Figure 4:
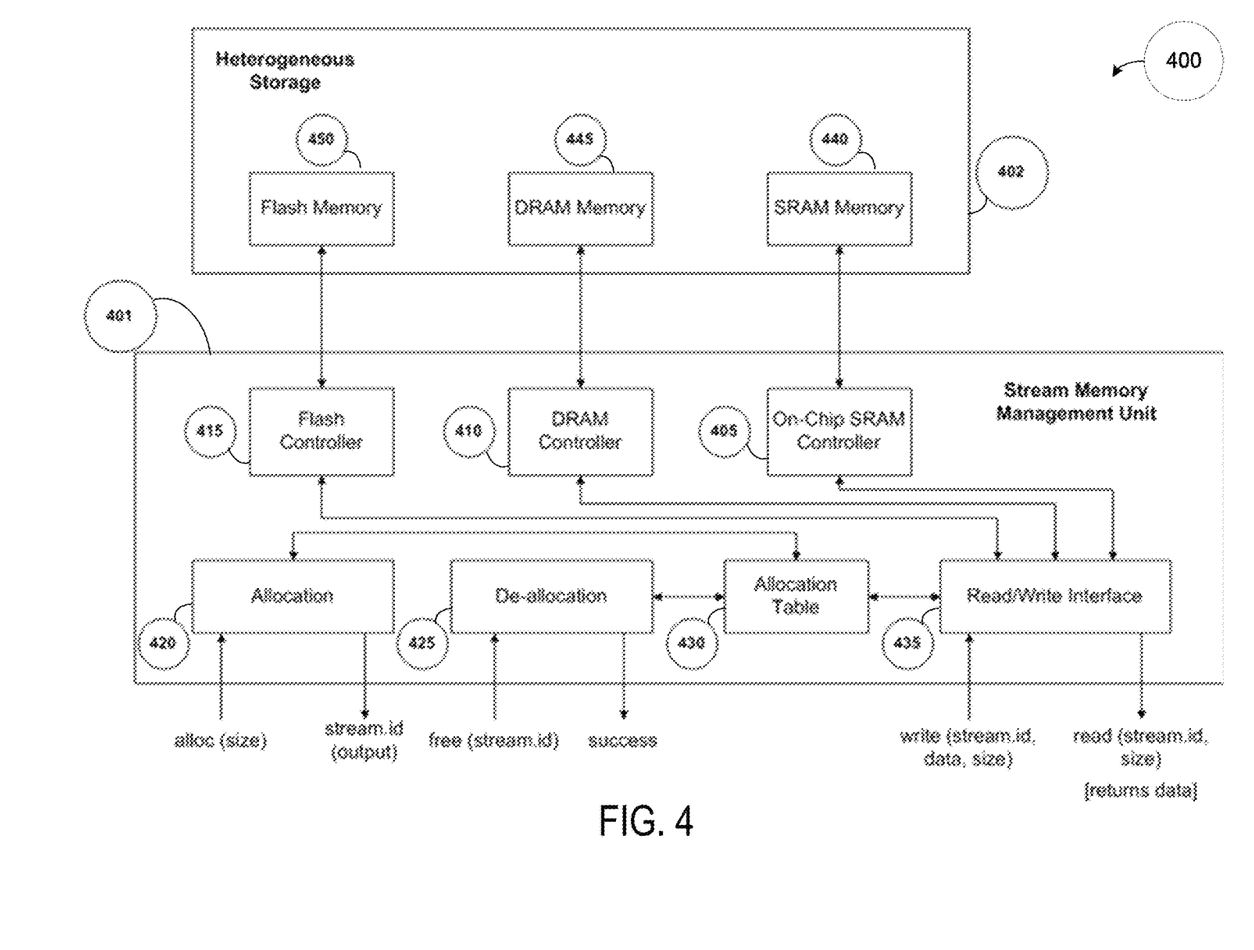
FIG. 4 shows a circuit arrangement that includes an SMMU, which controls a memory arrangement.

FIG. 4 shows a circuit arrangement 400 that includes an SMMU, which controls a memory arrangement. The SMMU 401 is coupled to heterogeneous storage element 402. The SMMU may be deployed on a NIC or integrated with a CPU as a System on Chip (SOC), for example. The logic of the SMMU may be implemented in a field programmable gate array (FPGA), as an application specific integrated circuit (ASIC), as part of a CPU architecture, or in various combinations of the foregoing. The SMMU may be designed using a hardware description language (HDL), a register transfer language (RTL), or a high-level programming language such as C or C++.

The heterogeneous storage element stores data during the operation of a streaming application. The heterogeneous storage element generally includes at least two different types of memory circuits. The heterogeneous storage element may include one or more SRAM memories (e.g., devices, modules or chips) 440 that store the data using SRAM circuitry; one or more DRAM memories 445 that store the data using DRAM circuitry; and/or one or more flash memories 450 that store the data using flash memory circuitry.

The SMMU is coupled to the heterogeneous storage arrangement and includes an SRAM controller 405, a DRAM controller 410, and a flash controller 415. The SRAM controller is responsible for reading and writing data into the SRAM memory, the DRAM controller is responsible for reading and writing data into the DRAM memory, and the flash controller 415 is responsible for reading and writing data into the Flash memory.

Memory allocation circuit 420 allocates memory space for the stream data. Every time a new stream of data (e.g., a packet) enters the system, the application logic requests allocation of memory from the SMMU. When the allocation circuit of the SMMU allocates memory, the allocation circuit creates a handle, called "stream.id." Once the stream.id is created, the stream.id is used to interface with the SMMU regarding allocating or de-(locating memory related to this stream.

Memory de-allocation circuit 425 de-allocates memory space occupied by stream data. The success signal is used to indicate that the SMMU was able to allocate memory and that it is not "full." This allows application logic to proceed further. In case the success signal indicates failure, then either application logic has to block till new memory is available or use on-chip memory. Memory allocation table 430 stores data describing the allocation of memory space to streams of data. Read/Write interface circuit 435 facilitates the reading and writing of data. The read/write interface may be an access circuit implemented as an ASIC, programmable logic, or as a CPU or microprocessor running software.

Memory allocation circuit 420 and de-allocation circuit 425 update the memory allocation table 430 with allocation and de-allocation/free memory information. Read/Write interface circuit 435 performs the read/write and checks memory allocation table 430 to determine whether or not the specific address/index is already allocated and then reads/writes data at the specified address.

In the disclosed template architecture, the parameters of the template are types of memory used (SRAM, DRAM and/or Rash) and type of allocation scheme used. Depending on the type of application, these parameters may be tuned, resulting in a flexible architecture and an efficient use of resources along with increased speed/reduced latency.

According to one implementation to allocate memory space for stream data, a stream consists of multiple data structures (ex. struct, class etc.) and may require different subsets of these structures at different moments during its lifetime. The specific handle/number assigned to a given stream is given by:

stream.id(Sn)=Stream n;

where n=0, 1, 2, . . . , N (representing number of streams). The length in the memory allocation table of a particular stream, Sn, is given by:

stream_len(Sn)=sum(ds_i);

where i=0, 1, 2, . . . , I, and ds_i is the length of data structure i. In other words, the stream_len(Sn) is a sum of the lengths of all the different data structures used in processing or representing the stream during the lifetime of the stream.

The memory allocation table 430 stores information that describes the allocation of memory space to streams of data as described by the definitions above. An entry in the allocation table includes the following fields:

<stream.id, base memory address, length, mem_id, free>

The stream identifier (stream.id) is the handle that is used to identify a specific stream and the data structures that are a subset of the stream data. For a given stream.id: the base memory address field indicates the first physical address in memory where the data corresponding to that specific stream is stored; the length field indicates the number of bytes of memory that are allocated for the specific stream data; the mem_id field indicates the type of memory device that the data is located in (e.g. Flash, DRAM or SRAM); and the free field is a single bit that indicates whether or not the entry in the allocation table is allocated for a stream.

Three algorithms for allocation of memory space for storage of stream data are presented below. Though only flash memory and DRAM are discussed in the strategies below, the strategies may be adapted to accommodate SRAM as another alternative. Data access patterns may be used to select between sequential, interleaved, and dynamic allocation algorithms. Data structure composition information associated with each different type of stream may indicate the data access patterns for the different stream types. For access patterns that have more spatial locality, a sequential allocation may be selected. For access patterns that have some spatial locality but a lot of temporal locality, an interleaved allocation may be selected. For data access patterns where the accesses are scattered over the address space, a dynamic approach may be selected. Polyhedral data models may be used to determine and identify access patterns.

In the sequential allocation algorithm, memory space for streams is allocated in contiguously addressed portions of memory (alternatively referenced as "sequential storage"), For instance, memory space is allocated for stream_0 followed by memory space for stream_1 and so on. The individual data structures (ds_0, ds_1, etc.) are also allocated in contiguously addressed portions of memory. In an allocation table entry for a stream.id, the length indicates the size of the sum of all the data structures for that stream.

Figure 5:
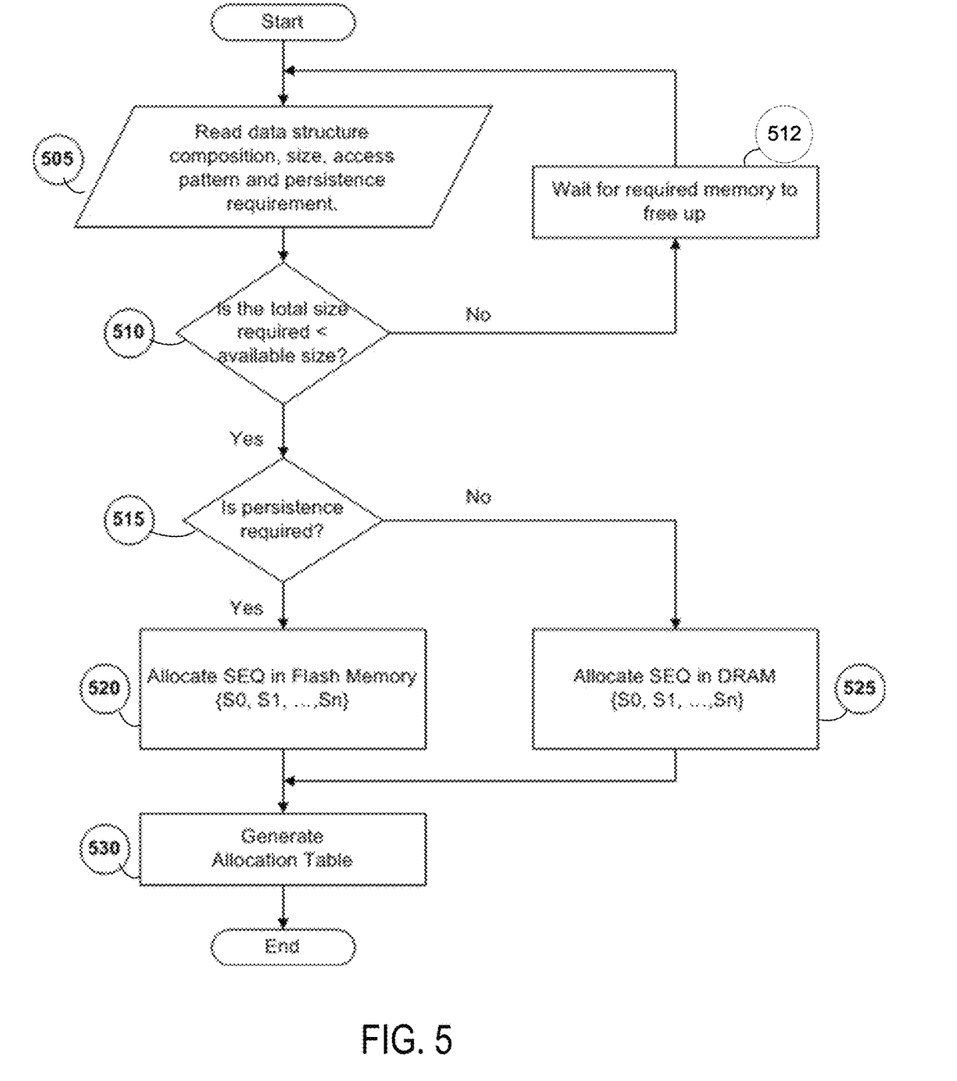
FIG. 5 shows a flow chart of a process for sequential allocation of memory space for a stream.

FIG. 5 shows a flow chart of a process for sequential allocation of memory space for a stream. The process of FIG. 5 is performed by the SMMU for each incoming stream. At block 505, the SMMU reads attributes for a given stream data. The attributes include the data structure composition (including lengths of data structures), length, access pattern and persistence requirement. The data structure composition is stream dependent and specifies a list of data structures, similar or different, that are required to process a particular incoming data stream to either produce an outgoing data stream or a required result that will be stored in to memory. The data structure composition may be established based on compile-time or design-time analysis of the possible streams, and is read each time a new stream of data arrives to determine the size and format of the stream. The persistence attribute indicates whether or not the associated stream data is to persist in storage if power is removed from the memory in which the stream data is stored.

A decision of using a specific allocation scheme is made based on this compile-time analysis, and firmware corresponding to such allocation is loaded into the allocation circuit 320. The access pattern provides liveness (or lifetime) information of each data structure. The liveness information indicates when a specific data structure is first written to and last read from. Compile-time, full program analysis provides an estimate of data structure life times, in relative times (not absolute time). For a persistent data structure, the liveness information may indicate when the data structure was last written to. The liveness information provides a relative lifetime of the specific data structure. The relative lifetime may be relative to other data structures in the specific application. This information enables allocation of memory for different data structures either within a single stream sequentially or interleaved between data streams to increase data locality in the memory.

Decision block 510 determines if the total allocation size (number of bytes of data based on the length) required for all the data structures of the stream data is less than an available contiguous portion of the memory. A portion of memory is "available" if that portion is not allocated to another stream or allocated to storage of other data. If the total size required is more than the available size, the SMMU holds the ingress stream and waits until memory frees up to allocate the memory required as shown by block 512. If the total size required is less than the available size, the persistence requirement for the stream data is then determined at decision block 515.

If persistence is required, sequential allocation is done in flash memory at block 520. Note that in a system that also includes SRAM, SRAM may be selected for data that is often accessed, because SRAM has the least latency. The allocation circuit 420 maintains respective memory allocation tables (not shown) for the different types of memories that are in addition to the stream memory allocation table 430. Each memory allocation table indicates which portions of the corresponding memory are allocated and which portions are available/free. In performing the sequential allocation, the allocation circuit 420 selects the next available portion of memory that satisfies the size requirement (length) for the stream. Stream memory allocation table 430 is provided as a reference for application logic to access the memory space via the SMMU. Table 430 includes a list of entries without any checks on whether the entries are valid. The format for each entry in table 430 is: <stream.id, base memory address, length, mem_id, free>. The memory allocation tables in allocation circuit 420 are for allocation logic in SMMU to verify whether or not any bounds are violated.

If persistence is not required, sequential allocation is done in DRAM at block 525. Sequential allocation of DRAM is performed in a manner similar to that described above for the flash memory. After allocation operations of blocks 520 and 525, an entry in the stream memory allocation table 430 is then generated in block 530.

Figure 6:
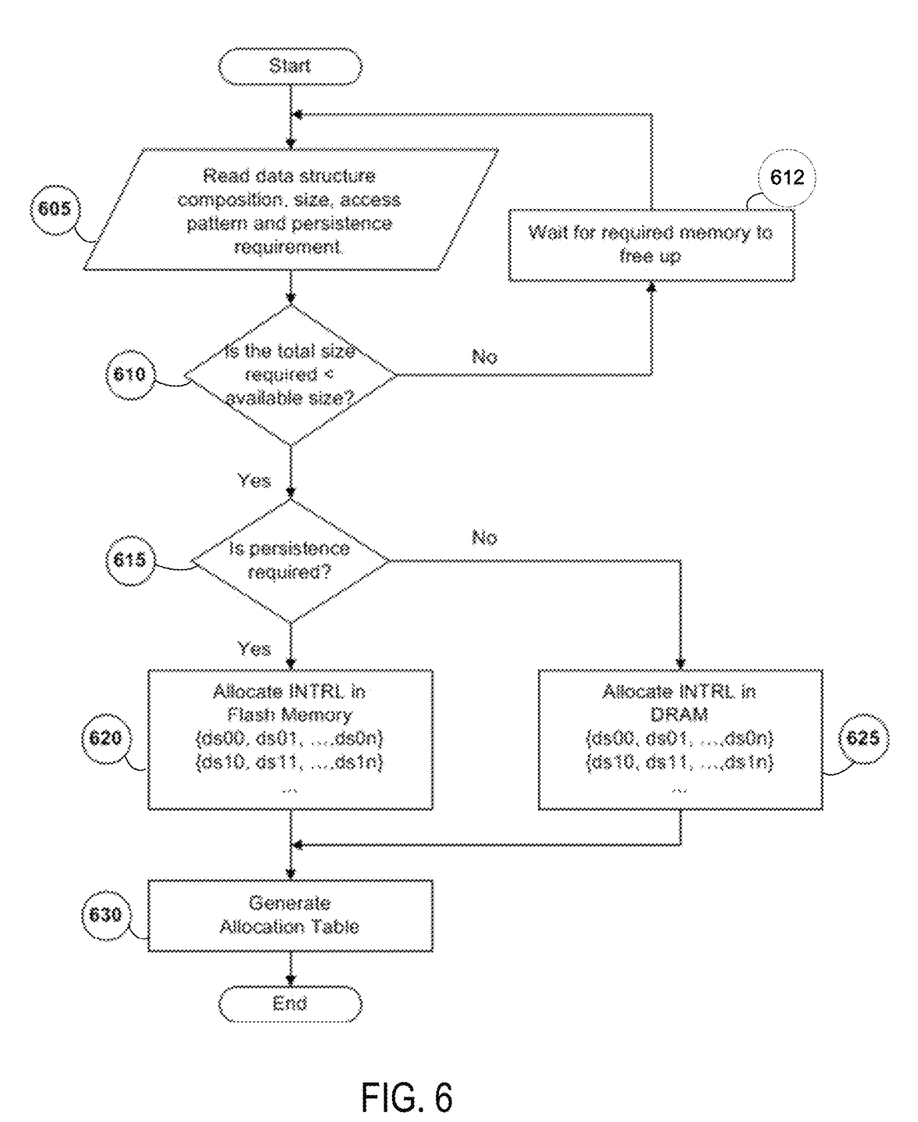
FIG. 6 shows a flowchart of a process for interleaved allocation of memory space for a stream.

FIG. 6 shows a flowchart of a process for interleaved allocation of memory space for a stream. In interleaved allocation, the various data structures (ds_i) that constitute a single stream are allocated starting at different base addresses in memory. Data corresponding to each stream is thus scattered across the memory space in an interleaved fashion across different streams of data (alternatively referenced as "interleaved storage"), For example, the following are the data structures for two data streams, S0 and S1. The corresponding data structures can be represented as follows:
S0={ds_00, ds_01, ds_02}
S1={ds_10, ds_11, ds_12}
An example of an interleaved allocation for the two streams is as follows: ds_00, ds_10, ds_01, ds_11, ds_02, ds_12. In interleaved allocation, each entry in the stream allocation table corresponds to one data structure of the subset of data structures. An example of such an allocation table entry is as follows:
<ds_[stream_id], base memory address, length, mem_id, free>
The field, ds_[stream.id], identifies a particular data structure (ds_i) of a particular stream (stream.id). While the allocation process still occurs at the stream level, the data access occurs at the individual data structure level.

At block 605, for a given stream data, the data structure composition (including lengths of data structures), length, access pattern and persistence requirement are read. At decision block 610, the SMMU determines whether there is sufficient space in memory to store the data structures of the incoming stream in an interleaved manner. There is sufficient space in the memory if for each of the data structures in the incoming stream there is a portion of contiguous memory space available for that data structure. If the total size required is more than the available size, at block 612 the SMMU holds the ingress stream and waits until memory frees up to allocate the memory required.

If the total size required is less than the available size, the persistence requirement for the stream data is then determined at block 615. If persistence is required, at block 620 the SMMU performs interleaved allocation in flash memory 620. The allocation circuit 420 selects the available portions of memory that satisfy the size requirements for the different data structures of the stream. As selecting between flash and DRAM, the main criteria are persistence and performance. DRAM is fast but not persistent. Flash memory is persistent but slower than DRAM.

If persistence is not required, at block 625 the SMMU performs interleaved allocation in DRAM. Interleaved allocation of DRAM is performed in a manner similar to that described above for the flash memory. After the allocation operations of blocks 620 and 625, the SMMU generates entries in the stream memory allocation table at block 630.

Figure 7:
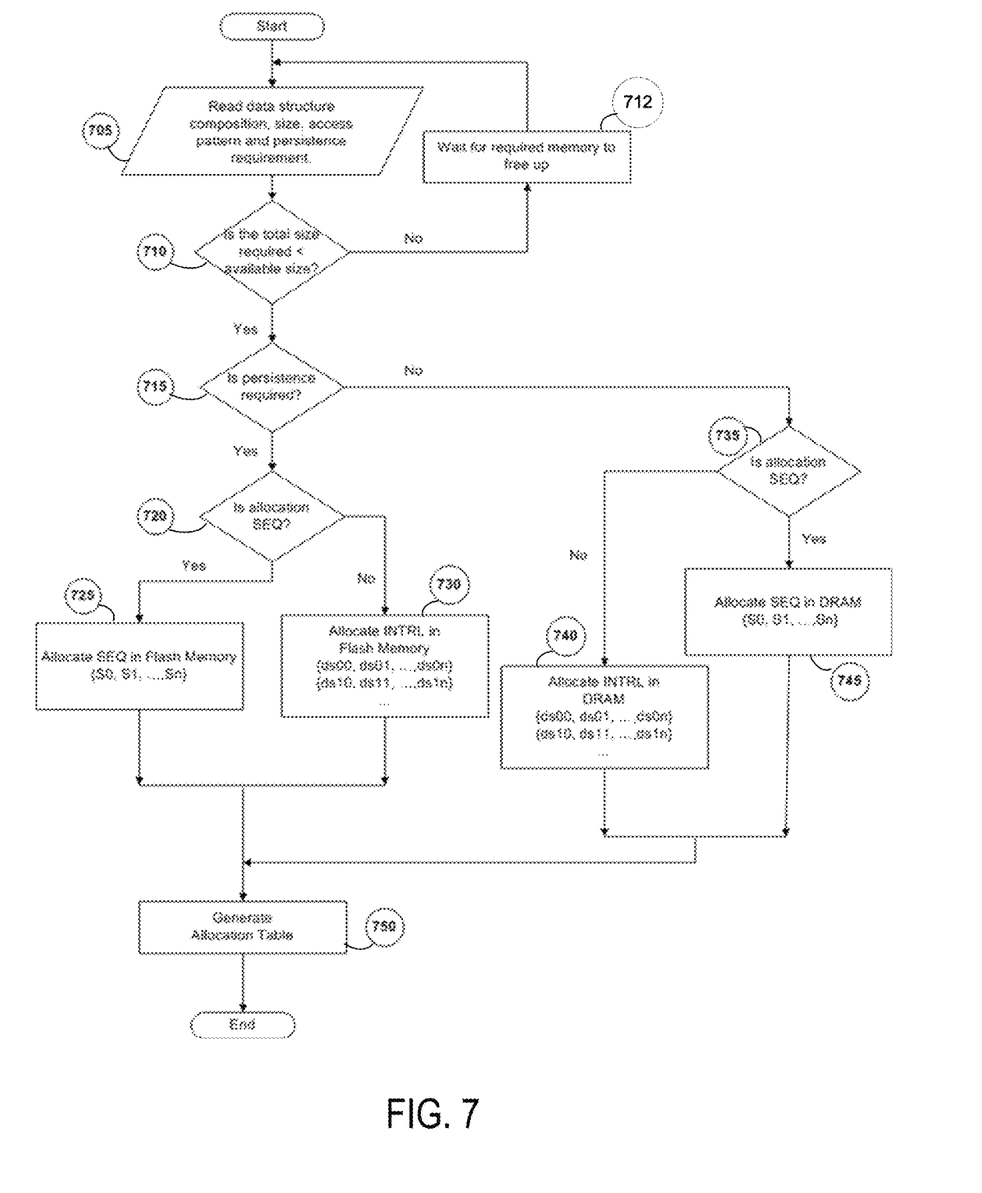
FIG. 7 shows a flowchart of a process for dynamic allocation of memory space for a stream.

FIG. 7 shows a flowchart of a process for dynamic allocation of memory space for a stream. The sequential and interleaved allocation approaches are both static in nature. The sequential and interleaved allocation approaches assume that all of the subset data structures are required to process a stream. In practice, based on run-time conditions, the data structures that are actually required for processing a specific stream can be determined. A dynamic allocation strategy will use run time parameters as input and decide on the allocation of just a subset of data structures. The dynamic approach may be beneficial in both memory-limited systems and systems in which the total set of data structure combinations at run-time is not too large, hence keeping the allocation algorithm less complex.

At run-time, the control-flow branch of the application logic being used will be known depending on the incoming data (e.g., packets). The control-flow branch information can be input to the allocation circuit by the application logic, and the allocation circuit can determine from the control-flow branch information and based on data access pattern logic that some other data structures will not be needed (unneeded ones of the data structures), because the other data structures would not exist on the control-flow branch. The allocation circuit can put more data in DRAM or in SRAM or alternatively more in Flash, depending on the criteria or application requirements. The dynamicity of this strategy is about defining the composition of a stream. This in turn however impacts the allocation. Once the dynamic composition of the stream is defined, depending on the specific application, either a sequential or interleaved allocation can then be applied.

At block 705, for a given stream data, the data structure composition (including lengths of data structures), length, access pattern and persistence requirement are read. At decision block 710, the SMMU determines if the total allocation size (number of bytes of data based on the length) required for the stream data is less than an available contiguous portion of memory. If the total size required is more than the available size, at block 712 the SMMU holds the ingress stream and waits until memory frees up to allocate the memory required.

If the total size required is less than the available size, at decision block 715 the SMMU determines the persistence requirement for the stream data based on the information read at block 705. If persistence is required, the SMMU determines if the allocation is sequential at decision block 720. If the allocation is determined to be sequential, based on a user-provided value of an input parameter, the SMMU performs sequential allocation in Flash memory at block 725. Note that in blocks 725, 730, 740, and 745, the allocation is performed as described above in the description of FIGS. 5 and 6 respectively. The user-provided input parameter indicates a specific branch taken in the application logic. The allocation circuit will now associate that data with the stream.id. At decision block 720, if the allocation is determined not to be sequential, interleaved allocation is then done in flash memory at block 730.

If persistence is not required, the SMMU determines at decision block 735 if the allocation is sequential. If SMMU determines the allocation to be sequential, based on an application logic-provided input parameter as described above, the SMMU performs sequential allocation in DRAM at block 740. If SMMU determines the allocation not to be sequential, the SMMU performs interleaved allocation in flash memory at block 745. After all the allocation steps, the SMMU generates the stream memory allocation table at block 750.

The de-allocation algorithm involves resetting the free bits to '1' in the stream memory allocation table to indicate that the space is now available. Data access involves looking up the stream memory allocation table to find the physical address of the data in memory.

Though aspects and features may in some cases be described in individual figures, it will be appreciated that features from one figure can be combined with features of another figure even though the combination is not explicitly shown or explicitly described as a combination.

The embodiments are thought to be applicable to a variety of memory systems. Other aspects and embodiments will be apparent to those skilled in the art from consideration of the specification. The embodiments may be implemented as one or more processors configured to execute software, as an application specific integrated circuit (ASIC), or as a logic on a programmable logic device. It is intended that the specification and illustrated embodiments be considered as examples only, with a true scope of the invention being indicated by the following claims.

What is claimed is:

1. A stream memory management circuit, comprising:
a first memory controller circuit configured and arranged to access a first memory of a first type;
a second memory controller circuit configured and arranged to access a second memory of a second type different from the first type;
an access circuit coupled to the first and second memory controller circuits and configured and arranged to input and output streaming data;
an allocation circuit coupled to the access circuit, the allocation circuit configured and arranged to:
input an allocation request;
select either the first memory or the second memory for allocation of storage for the streaming data in response to the allocation request, wherein the selection of either the first memory or the second memory is based on attributes associated with the streaming data; and
update a memory allocation table of the stream memory management circuit with allocation information, wherein:
the attributes indicate liveness information for data in the streaming data:
the streaming data includes a plurality of data structures; and
the liveness information indicates times when a data structure of the plurality of data structures is first written to and last read from;
select between allocating sequential storage or interleaved storage for the streaming data in response to the liveness information; and
a de-allocation circuit coupled to the access circuit and configured and arranged to de-allocate storage assigned to the streaming data from the first and second memories.

2. The stream memory management circuit of claim 1, wherein the first memory controller circuit controls DRAM and the second memory controller circuit controls flash memory.

3. The stream memory management circuit of claim 1, wherein the streaming data includes a plurality of data streams, each data stream has an associated set of attributes, and the attributes include a persistence attribute that indicates whether or not the associated data stream is to persist in storage if power is removed from one of the first memory or the second memory in which the data stream is stored.

4. The stream memory management circuit of claim 3, wherein the allocation circuit is configured and arranged to allocate storage in flash memory for a data stream of the plurality of data streams in response to the persistence attribute associated with the data stream indicating the data stream is to persist in storage.

5. The stream memory management circuit of claim 4, wherein the allocation circuit is configured and arranged to allocate storage in DRAM for the data stream of the plurality of data streams in response to the persistence attribute associated with the data stream indicating the data stream need not persist in storage.

6. The stream memory management circuit of claim 1, wherein the streaming data includes a plurality of data streams, each data stream has an associated set of the attributes, the attributes associated with the data stream specify a type of data access pattern for the data stream, and the allocation circuit is configured and arranged to allocate sequential or interleaved storage for the data stream in response to the attributes associated with the data stream indicating the type of data access pattern for the data stream.

7. The stream memory management circuit of claim 1, wherein the streaming data includes a plurality of data streams, each data stream has an associated set of attributes, the attributes associated with a data stream specify a type of data access pattern for the data stream, each data stream includes a plurality of data structures, and the allocation circuit is configured and arranged to determine needed and unneeded ones of the plurality of data structures for each data stream and select between allocating sequential storage or interleaved storage for the needed ones of the data structures in response to the attributes associated with the data stream indicating the type of data access pattern for the data stream.

8. The stream memory management circuit of claim 1, wherein the first and second memory controller circuits, the access circuit, the allocation circuit, and the de-allocation circuit are implemented on a network interface card (NIC).

9. The stream memory management circuit of claim 8, wherein the NIC includes a System on Chip (SOC), and the SOC includes a central processing unit.

10. The stream memory management circuit of claim 1, wherein one or more of the first and second memory controller circuits, the access circuit, the allocation circuit, and the de-allocation circuit are implemented in a field programmable gate array (FGPA).

11. The stream memory management circuit of claim 1, wherein one or more of the first and second memory controller circuits, the access circuit, the allocation circuit, and the de-allocation circuit are implemented in an application specific integrated circuit (ASIC).

12. The stream memory management circuit of claim 1, wherein one or more of the first and second memory controller circuits, the access circuit, the allocation circuit, and the de-allocation circuit are implemented on a central processing unit (CPU).

13. The stream memory management circuit of claim 1, wherein one or more of the first and second memory controller circuits, the access circuit, the allocation circuit, and the de-allocation circuit are implemented in one of a hardware description language (HDL), a register transfer language (RTL), or a high-level programming language.

14. A storage system, comprising:
a first memory of a first type;
a second memory of a second type different from the first type;
a stream memory management unit that includes:

a first memory controller circuit coupled to and configured and arranged to access the first memory;

a second memory controller circuit coupled to and configured and arranged to access the second memory;

an access circuit coupled to the first and second memory controller circuits;

an allocation circuit coupled to the access circuit, the allocation circuit configured and arranged to:

input an allocation request;

select either the first memory or the second memory for allocation of storage for streaming data in response to the allocation request, wherein the selection of either the first memory or the second memory is based on attributes associated with the streaming data, wherein:

the attributes indicate liveness information for data in the streaming data:

the streaming data includes a plurality of data structures; and the liveness information indicates times when a data structure of the plurality of data structures is first written to and last read from;

select between allocating sequential storage or interleaved storage for the streaming data in response to the liveness information; and update a memory allocation table of the stream memory management unit with allocation information; and a de-allocation circuit coupled to the access circuit and configured and arranged to de-allocate storage assigned to the streaming data from the first and second memories.

15. The storage system of claim 14, wherein the first memory controller circuit controls DRAM and the second memory controller circuit controls flash memory.

16. The storage system of claim 14, wherein the streaming data includes a plurality of data streams, each data stream has an associated set of attributes, and the attributes include a persistence attribute that indicates whether or not the associated data stream is to persist in storage if power is removed from the memory in which the data stream is stored.

17. The storage system of claim 16, wherein the allocation circuit is configured and arranged to allocate storage in flash memory for a data stream of the plurality of data streams in response to the persistence attribute associated with the data stream indicating the data stream is to persist in storage.

18. The storage system of claim 17, wherein the allocation circuit is configured and arranged to allocate storage in DRAM for the data stream of the plurality of data streams in response to the persistence attribute associated with the data stream indicating the data stream need not persist in storage.

19. The storage system of claim 14, wherein the streaming data includes a plurality of data streams, each data stream has an associated set of the attributes, the attributes associated with a data stream specify a type of data access pattern for the data stream, and the allocation circuit is configured and arranged to allocate sequential or interleaved storage for the data stream in response to the attributes associated with the data stream indicating the type of data access pattern for the data stream.

20. The storage system of claim 14, wherein the streaming data includes a plurality of data streams, each data stream has an associated set of attributes, the attributes associated with a data stream specify a type of data access pattern for the data stream, each data stream includes a plurality of data structures, and the allocation circuit is configured and arranged to determine needed and unneeded ones of the plurality of data structures for each data stream and select between allocating sequential storage or interleaved storage for the needed ones of the data structures in response to the attributes associated with the data stream indicating the type of data access pattern for the data stream.

21. A method of managing a heterogeneous memory arrangement, comprising:

inputting streaming data by an access circuit;

inputting an allocation request;

selecting by an allocation circuit either a first memory or a second memory for allocation of storage for the streaming data in response to the allocation request, wherein:

the selection of either the first memory or the second memory is based on attributes associated with the streaming data, the first memory of a first type and the second memory of a second type different from the first type;

the attributes indicate liveness information for data in the streaming data;

the streaming data includes a plurality of data structures;

the liveness information indicates times when a data structure of the plurality of data structures is first written to and last read from; and the selecting includes selecting between allocation of sequential storage or interleaved storage for the associated data stream in response to the liveness information;

updating a memory allocation table of the heterogeneous memory arrangement with allocation information;

allocating storage for the streaming data in one of the first or second memories;

accessing the first memory by a first memory controller circuit;

accessing the second memory by a second memory controller circuit; and de-allocating storage assigned to the streaming data from the first and second memories by a de-allocation circuit.

22. The method of claim 21, wherein:

the accessing the first memory includes accessing DRAM; and accessing the second memory includes accessing flash memory.

23. The method of claim 21, wherein the streaming data includes a plurality of data streams, each data stream has an associated set of attributes, and the attributes include a persistence attribute that indicates whether or not the associated data stream is to persist in storage if power is removed from the memory in which the data stream is stored.

24. The method of claim 23, wherein the selecting includes selecting storage in flash memory for a data stream of the plurality of data streams in response to the persistence attribute associated with the data stream indicating the data stream is to persist in storage.

25. The method of claim 24, wherein the selecting includes selecting storage in DRAM for the data stream of the plurality of data streams in response to the persistence attribute associated with the data stream indicating the data stream need not persist in storage.

26. The method of claim 21, wherein:

the streaming data includes a plurality of data streams, each data stream has an associated set of the attributes, the attributes associated with a data stream specify a type of data access pattern for the data stream; and the selecting includes selecting sequential or interleaved storage for the data stream in response to the attributes associated with the data stream indicating the type of data access pattern for the data stream.

27. The method of claim 21, wherein:

the streaming data includes a plurality of data streams, each data stream has an associated set of attributes, the attributes associated with a data stream specify a type of data access pattern for the data stream, each data stream includes a plurality of data structures; and the selecting includes determining needed and unneeded ones of the plurality of data structures for each data stream and selecting between allocating sequential storage or interleaved storage for the needed ones of the data structures in response to the attributes associated with the data stream indicating the type of data access pattern for the data stream.

* * * * *